J. E. MILLICE.
Track-Clearers for Mowers.

No. 157,756. Patented Dec. 15, 1874.

Witnesses:
Will H. Dodge
Wm E. Chaffee

Inventor:
J. E. Millice
by Dodge & Son
Attys.

UNITED STATES PATENT OFFICE.

JOSEPH E. MILLICE, OF MECHANICSBURG, OHIO.

IMPROVEMENT IN TRACK-CLEARERS FOR MOWERS.

Specification forming part of Letters Patent No. 157,756, dated December 15, 1874; application filed November 3, 1874.

*To all whom it may concern:*

Be it known that I, JOSEPH E. MILLICE, of Mechanicsburg, in the county of Champaign and State of Ohio, have invented certain Improvements in Track-Clearers for Mowing-Machines, of which the following is a specification:

My invention relates to track-clearers for mowing-machines; and it consists of a V-shaped body, having its upper surface inclined, with a wheel attached on the side next to the cut grass, in such a position that it will run on the grass or vines and hold it down while the body passes along and separates the cut from the uncut material. It further consists in a guard arranged around the front and upper sides of the wheel, to prevent the grass or vines from being drawn in between the wheel and body, all as hereinafter described.

Figure 1:
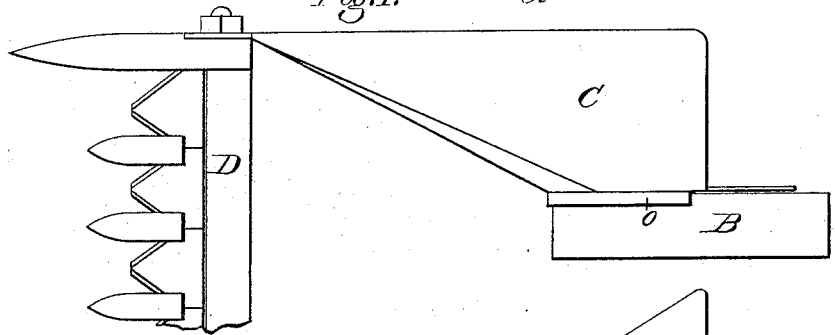
Figure 2:
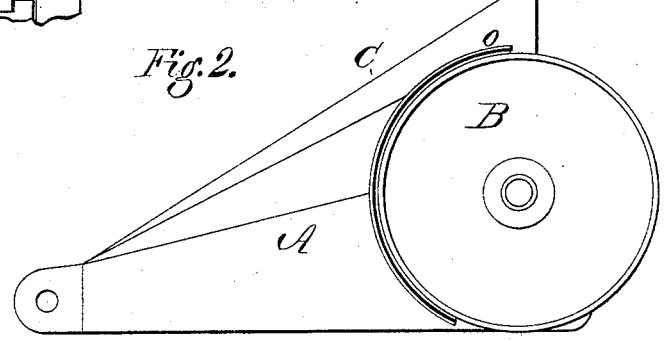
Figure 3:
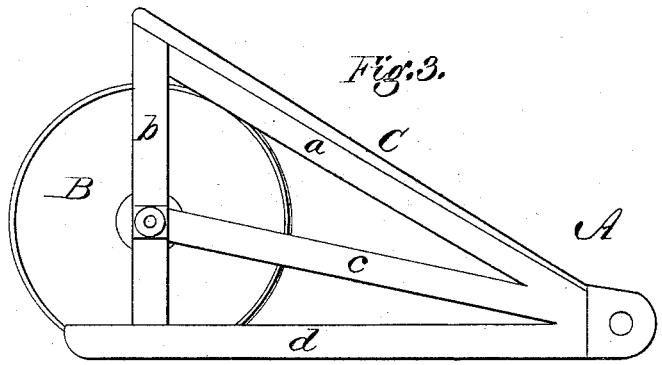
Figure 4:
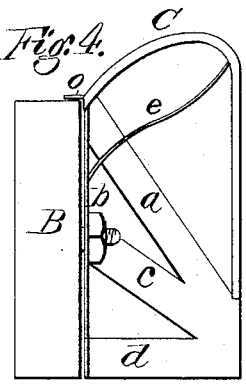

Figure 1 is a top-plan view. Figs. 2 and 3 are side elevations of the opposite sides, respectively; and Fig. 4 is a rear-end elevation.

My improved device consists of a metallic plate, which has its front end of proper width to be attached vertically to the outer end of the cutter-bar D, as shown in Fig. 1. From its front end backward it is inclined inward, as shown in Fig. 1, and also upward, as shown in Fig. 2, its upper surface C being curved over outward, as shown in Fig. 4, it being concave on its outer side. This plate may be made of sheet metal, in which case it will be supported and strengthened by metal strips *a*, *b*, *c*, *d*, and *e*, as shown in Figs. 3 and 4, these strips or bars thus forming a frame upon which the sheet-metal body is secured. As is obvious, it may be made of wood, or it may have a wooden frame covered with sheet metal; or it may be made of cast-iron, provided it be made sufficiently light. To its inner side, at the rear end, I secure a wheel, B, as shown in the several figures; and around the front of the wheel there projects, from the body A, a narrow strip, *o*, which serves as a guard to prevent the grass and other material from being drawn in between the wheel and the body, which would tend to prevent the free rotation of the wheel. This wheel is arranged so as to come even with the bottom, or slightly below it, so as to bear on the ground, whereby the wheel is made to rotate, and also to support the rear end of the device.

This track-clearer thus made is to be attached to the outer end of the cutter-bar in the usual manner, as represented in Fig. 1, where there is shown a portion of a cutter-bar, and its operation is as follows: As the machine moves along, the cut grass at the outer end of the bar D is crowded inward by the vertical and inwardly-inclined surface of the clearer A, and thus separated entirely from the uncut grass, the outer edge passing along close to and parallel with the edge of the standing grass.

In case the grass is tangled or lodged, or in case of there being vines of any kind in the grass, which often happens, and which renders it difficult of separation, it rides up along the inclined top, which tends to pull the grass and vines apart; and this separation is effectually completed by the aid of the wheel B, which runs on and over the cut portion, thereby pulling and holding it down.

In practice I find this track-clearer to be especially effective where the grass is lodged or tangled, and where there are vines in it, while at the same time it works perfectly in standing grass.

In use it separates the cut from the uncut grass perfectly, leaving a clear space of some seven or eight inches between them.

It may, of course, be varied in size, and somewhat in proportions, so long as the construction and arrangement is retained.

Having thus described my invention, what I claim is—

1. A track-clearer for mowers, consisting of a V-shaped body, having an inclined top, C, with a wheel, B, attached thereto on the side which comes next to the cut grass, the same being constructed to operate substantially as described.

2. The laterally-projecting flange *o*, attached to the body above and in front of the wheel, to prevent the wheel from becoming clogged by the cut grass, vines, &c., as set forth.

JOSEPH E. MILLICE.

Witnesses:
MARSALIES LEGGE,
HOMER W. TAYLOR.